United States Patent
Molstad et al.

(10) Patent No.: US 7,173,794 B2
(45) Date of Patent: Feb. 6, 2007

(54) ACCESSING BOTH SIDES OF DATA STORAGE TAPE

(75) Inventors: Richard W. Molstad, St. Paul, MN (US); Douglas W. Johnson, Stillwater, MN (US); Robert W. Tapani, Oakdale, MN (US)

(73) Assignee: Imation Corp., Oakdale, MN (US)

(*) Notice: Subject to any disclaimer, the term of this patent is extended or adjusted under 35 U.S.C. 154(b) by 329 days.

(21) Appl. No.: 10/664,235

(22) Filed: Sep. 17, 2003

(65) Prior Publication Data

US 2005/0057858 A1 Mar. 17, 2005

(51) Int. Cl.
*G11B 5/54* (2006.01)
*G11B 5/55* (2006.01)
*G11B 21/08* (2006.01)
*G11B 21/22* (2006.01)

(52) U.S. Cl. ........................ 360/251; 360/261
(58) Field of Classification Search ............ 360/251, 360/251.1, 251.2, 251.3, 251.4, 251.5, 261, 360/261.1, 261.2, 261.3
See application file for complete search history.

(56) References Cited

U.S. PATENT DOCUMENTS

| 3,169,720 A | * | 2/1965 | Proctor ..................... 360/251 |
| 4,510,543 A | * | 4/1985 | Ohta et al. ................. 360/261 |
| 5,850,320 A | | 12/1998 | Warmka et al. |
| 6,084,740 A | | 7/2000 | Leonhardt et al. |
| 6,319,595 B1 | | 11/2001 | Katashima et al. |
| 6,856,488 B2 | * | 2/2005 | King et al. ................. 360/251 |
| 2002/0041982 A1 | | 4/2002 | Katashima et al. |

FOREIGN PATENT DOCUMENTS

JP 61265767 A * 11/1986

* cited by examiner

*Primary Examiner*—Craig A. Renner
(74) *Attorney, Agent, or Firm*—Eric D. Levinson

(57) ABSTRACT

The invention provides a tape drive comprising a head mounted on a turntable. The turntable rotates to allow the head to access first and second sides of a data storage tape. Techniques for accessing the first and second sides may include rotating the turntable to position the head in first and second positions. In addition, the techniques may further include raising and lowering the turntable relative to the data storage tape in order to facilitate access to both sides of the data storage tape without requiring the data storage tape to be unspooled and re-spooled.

17 Claims, 11 Drawing Sheets

ACCESSING BOTH SIDES OF DATA STORAGE TAPE

TECHNICAL FIELD

The invention relates to data storage tape such as magnetic tape and, more particularly, a head to access the data storage tape.

BACKGROUND

Data storage tape is commonly used for storage and retrieval of data, and comes in many forms, such as magnetic tape, magneto-optical tape, optical tape, holographic tape, and the like. In magnetic tape, for example, data is typically stored as magnetic signals that are magnetically recorded on a surface of the magnetic tape. The data stored on the surface is often organized along data tracks, and a typical magnetic tape generally includes several data tracks. Optical tape, holographic tape and other tape formats may also make use of data tracks.

Magnetic tape remains an economical medium for storing large amounts of data. For example, magnetic tape cartridges, or large spools of magnetic tape, are often used to back up large amounts of data for large computing centers. Magnetic tape cartridges also find application in the backup of data stored on smaller computers such as desktop or laptop computers.

A data storage tape is generally wound around a spool. In some cases, the spool may be included within a data tape cartridge. A data storage tape system typically includes a tape drive comprising a head to access the data storage tape and facilitate reading and writing data to a surface of the data storage tape. Within the data storage tape system, the tape may be unspooled and passed over the head so that data can be written to the data storage tape or read from the tape.

SUMMARY

In general, the invention is directed to systems and techniques for accessing both sides of data storage tape using a single head. The head is mounted on a turntable. By rotating the turntable, the head can be moved to facilitate access to a first side of the data storage tape and a second side of the data storage tape. In various embodiments, the data storage tape may be magnetic, magneto optical, optical, holographic, or the like. For example, the tape may be double-sided in that information can be stored or recorded on both sides of the tape. By facilitating access to both sides of the tape using a single head, a data storage tape system can be simplified.

In one embodiment, the invention is directed to a system comprising data storage tape including first and second sides, and a head mounted on a turntable, wherein the turntable rotates to allow the head to access the first and second sides of the data storage tape.

In another embodiment, the invention is directed to a data storage tape drive comprising a head mounted on a turntable, wherein the turntable rotates to allow the head to access first and second sides of a data storage tape.

In another embodiment, the invention is directed to a method comprising accessing a first side of a data storage tape with a head mounted on a turntable, rotating the turntable, and accessing a second side of the data storage tape with the head.

The invention may be capable of providing one or more advantages. For example, in accordance with the invention, a tape drive may access both sides of a double-sided data storage tape using a single head. In this manner, a tape drive capable of accessing both sides of data storage tape may be simplified. In some embodiments, the data storage tape is re-spooled and then unspooled past the head after rotating the turntable in order to allow the head to access both sides of the tape. In other embodiments, the head can access both sides of data storage tape without requiring the tape to be re-spooled and then unspooled past the head.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
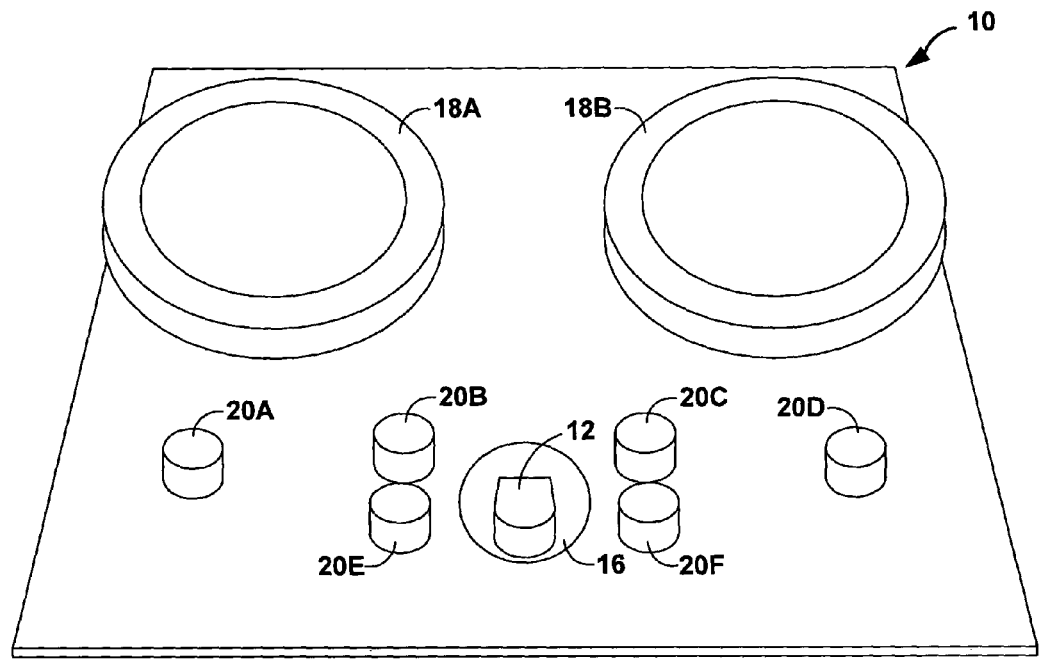
FIGS. 1A–1H are perspective views illustrating an exemplary data storage tape system according to an embodiment of the invention.

FIGS. 1A–1H are perspective views illustrating an exemplary data storage tape system 10 according to an embodiment of the invention. System 10 includes a head 12 that can access a first side 15A and a second side 15B of a data storage tape 14. In particular, head 12 is mounted on a turntable 16, which rotates to allow head 12 to access both of sides 15A and 15B of data storage tape 14. For example, data storage tape 14 may comprise magnetic tape coated with magnetic recording material on both sides 15A and 15B. In any case, data storage tape system 10 allows head 12 to access both sides 15A and 15B of data storage tape 14 in order to write data to tape 14 or read data from tape 14.

In the description that follows, many details of the invention will be provided in the context of data storage tape 14 in the form of magnetic tape, and head 12 in the form of a magnetic head. In that case, head 12 generally refers to a magnetic transducer head used for reading data from data storage tape 14 or writing data to data storage tape 14. Moreover, in that case, head 12 typically contacts data storage tape 14. It is understood, however, that head 12 in the form of a magnetic head is merely one exemplary embodiment of the invention. In other words, head 12 may also be embodied as a magneto-optic head, a holographic read head, or any other data storage head capable of reading or writing data to data storage tape 14 in the form of magneto-optic tape, holographic tape, or the like. In those cases, head 12 may access both sides of data storage tape 14 with, or possibly without, making contact with the different sides of tape 14.

Head 12 may define a magnetic gap oriented transverse to the path of data storage tape 14, and head 12 may be movable in lateral directions across the width of tape 14 to access different tracks of data storage tape 14. For example, a stepper motor (not shown), or the like, may allow for lateral movement of head 12 relative to tape 14 in order to facilitate positioning with respect to different tracks on data storage tape 14. In the example where head 12 is a magnetic head, head 12 may comprise an electromagnet, such as a ferromagnetic C-shaped core wrapped with a wire coil. In that case, head 12 defines a read or write gap from which a magnetic field permeates to facilitate recording of data on data storage tape 14. When current flows through the coil of head 12, magnetic flux flows through the core and a magnetic field forms across the gap of head 12. The field penetrates data storage tape 14 as tape 14 passes over head 12 resulting in residual magnetization of tape 14. A hysteresis curve typically defines how the magnetic domains of data storage tape 14 can be oriented or reoriented in response to application and removal of magnetic fields.

Moreover, if head 12 is a magnetic head, a controller (not shown in FIG. 1) including a driver circuit may cause current to flow through a coil around head 12, thereby energizing head 12 and generating the magnetic field. The driver circuit may, for example, send pulses of current regulated and timed at the direction of the head controller (not shown).

In order to read information from data storage tape 14 in the form of magnetic tape, head 12 contacts the surface of tape 14. The magnetizations on tape 14 are captured by head 12, producing current flow through the coil around head 12. These current flows, in turn, may be interpreted by a head controller (not shown in FIG. 1) to read the data stored on data storage tape 14. Again, contact between head 12 and data storage tape 14 is generally specific to some embodiments. In other embodiments, however, head 12 may access both sides of data storage tape 14 with or without physical contact.

FIG. 1A is a perspective view illustrating a data storage tape system 10. System 10 may include spools 18A and 18B wound with a data storage tape and guides 20A–20F to define one or more tape paths though system 10. For example, a first subset of guides 20 (guides 20A and 20D) may define a first tape path, a second subset of guides 20 (guides 20A, 20B, 20C and 20D) may define a second tape path and a third subset of guides 20 (guides 20A, 20E, 20F, and 20D) may define a third tape path. One or both of spools 18A, 18B may be housed in a data tape cartridge, although the invention is not limited in that respect.

In accordance with the invention, head 12 is mounted on a turntable 16. Turntable 16 rotates to allow head 12 to access both sides 15A, 15B (illustrated in FIG. 1B) of data storage tape 14 (illustrated in FIG. 1B), as described herein. A motor (not shown) may be controlled to facilitate rotation of turntable 16. Turntable 16 may be capable of rotating head 12 any number of degrees and the specific rotation described below is in no way limiting of the invention.

Figure 1B:
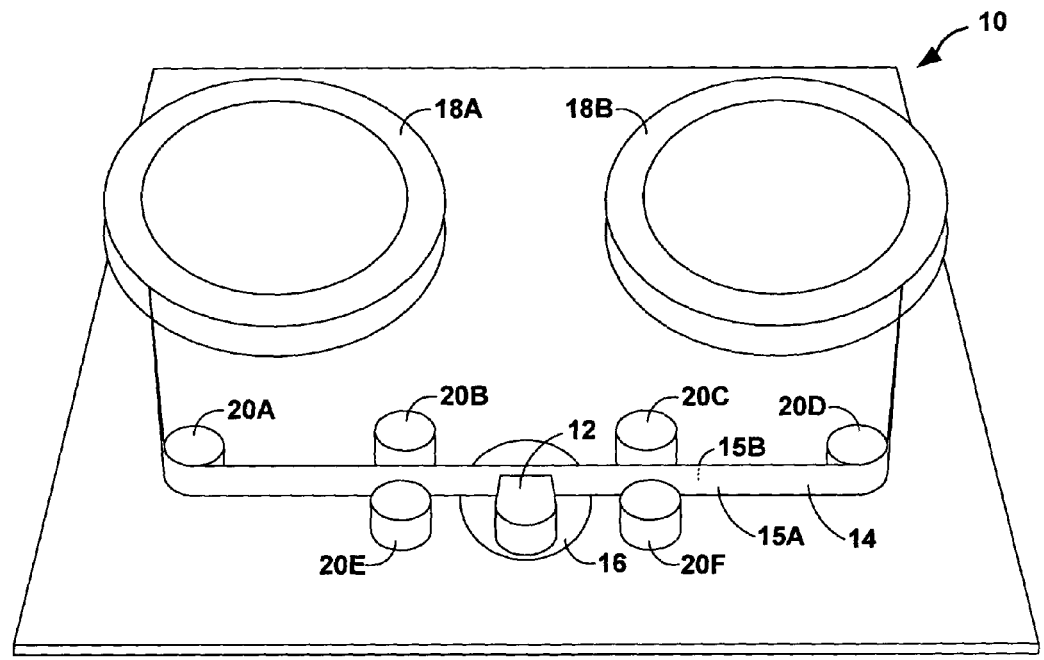
Figure 1C:
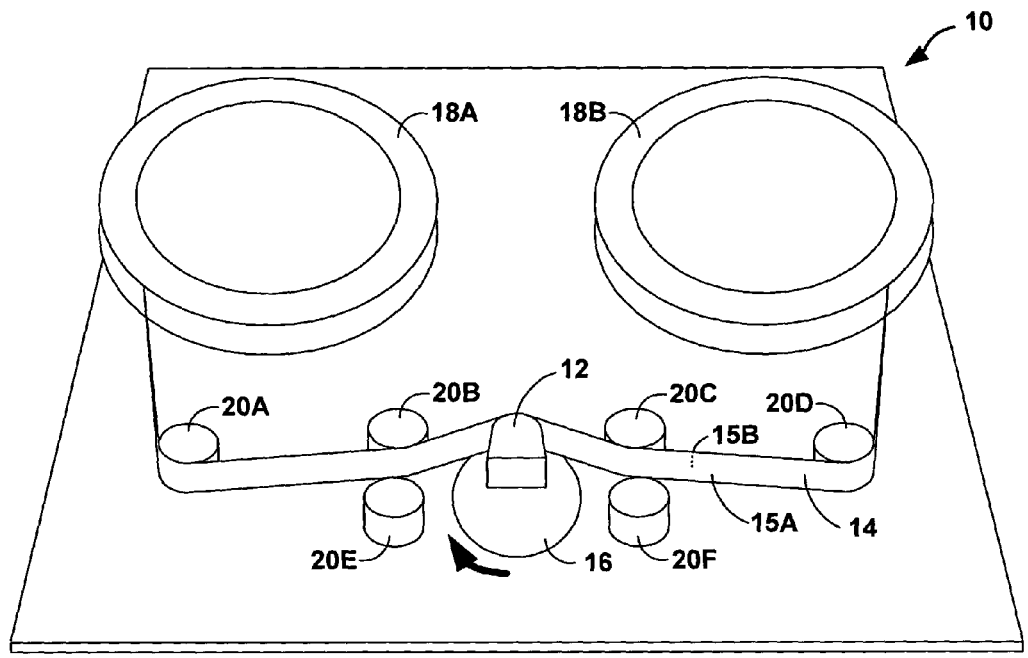

In exemplary embodiments, turntable 16 rotates head 12 from a first position (as illustrated in FIG. 1B) to a second position (as illustrated in FIG. 1C). The first position may be rotated 180 degrees relative to the second position, although the invention is not limited in that respect.

Initially, as shown in FIG. 1A, head 12 is positioned in the first position and data storage tape 14 is not proximate to head 12. Data storage tape 14 is fed along the first tape path proximal to head 12 (as illustrated in FIG. 1B). In particular, a tape feeder mechanism may be used to unspool data storage tape 14 from spool 18A and wind data storage tape 14 around spool 18B. The first subset of guides 20 (guides 20A and 20D) facilitates positioning data storage tape 14 along the first tape path.

By way of example, data storage tape 14 may comprise a digital linear tape (DLT). For example, spool 18A may be housed in a cartridge and data storage tape 14 may include a leader mechanism that allows for automated unspooling of data storage tape 14 from spool 18A to spool 18B. In that case, spool 18B forms part of a tape drive. Second spool 18B is driven to pull data storage tape from first spool 18A through a tape path in proximity of head 12. After being completely unspooled, data storage tape 14 can be rewound upon spool 18A.

After positioning data storage tape 14 proximal to head 12, turntable 16 can be rotated, e.g., by a motor (not shown), to move head 12 from the first position (as shown in FIG. 1B) to the second position (as illustrated in FIG. 1C) in order to contact head 12 with first side 15A of data storage tape 14. In other words, in the configuration illustrated in FIG. 1B, wherein head 12 is in the first position, head 12 is not in contact with data storage tape 14. However, in the configuration illustrated in FIG. 1C, wherein head 12 is in the second position, head 12 is in contact with data storage tape 14. The second subset of guides 20A, 20B, 20C and 20D positions data storage tape 14 to facilitate contact between head 12 and first side 15A of data storage tape 14.

When contacting first side 15A of data storage tape 14, head 12 may write data to first side 15A or read data from first side 15A of data storage tape 14. For example, when head 12 is positioned as illustrated in FIG. 1C, spool 18B may rotate to pull data storage tape 14 through the second tape path from spool 18A so that data can be written to side 15A or read from side 15A of data storage tape 14.

Figure 1D:
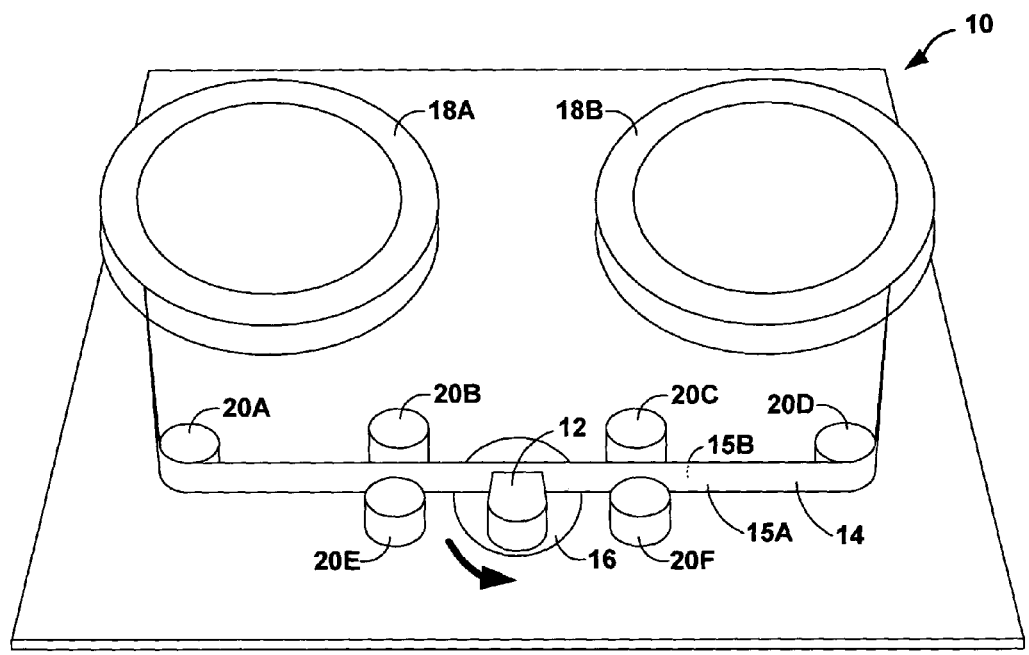
Figure 1E:
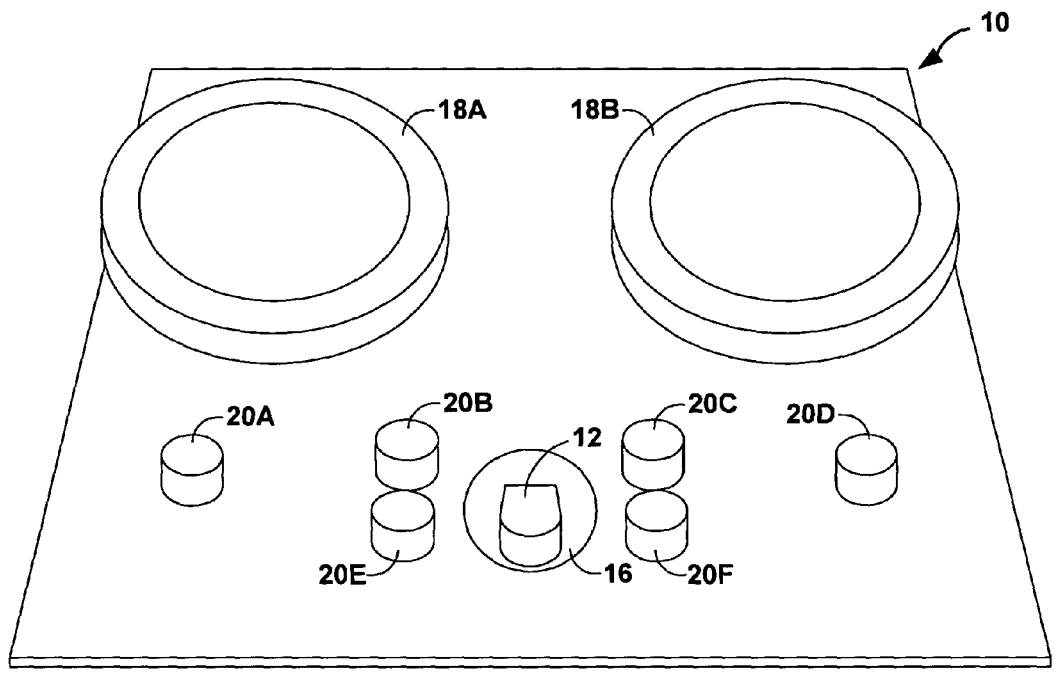
Figure 1F:
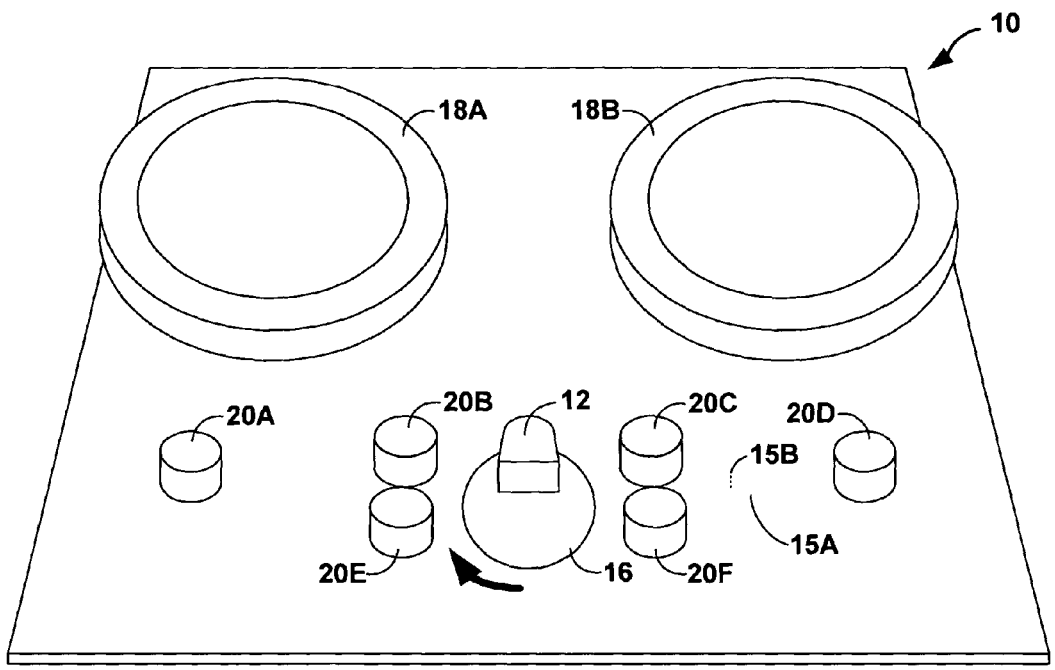
Figure 1G:
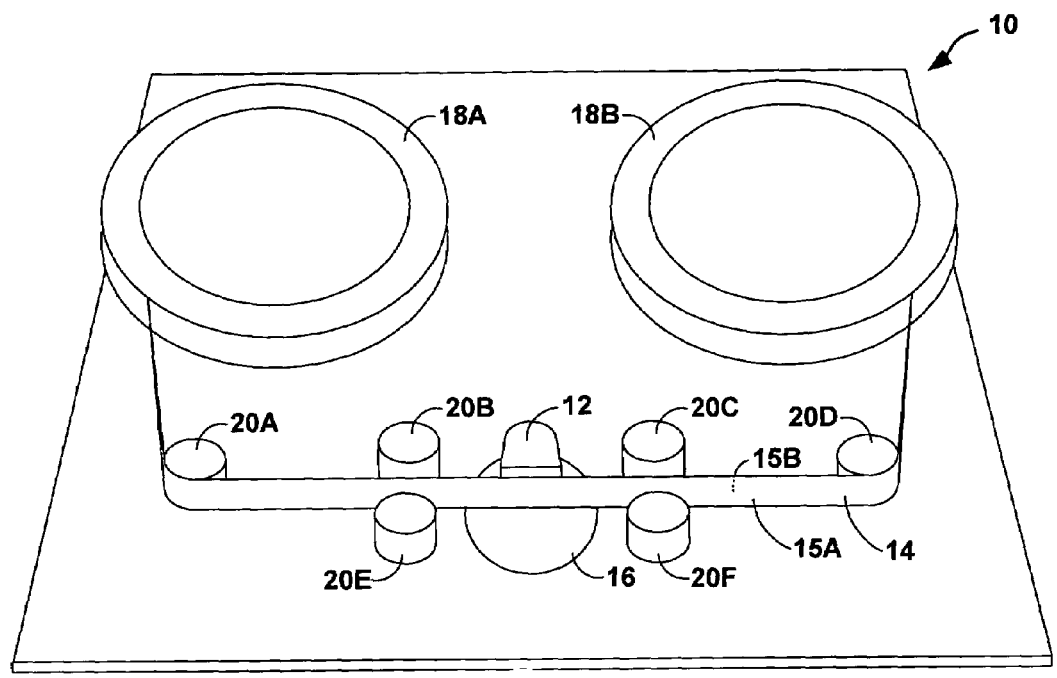
Figure 1H:
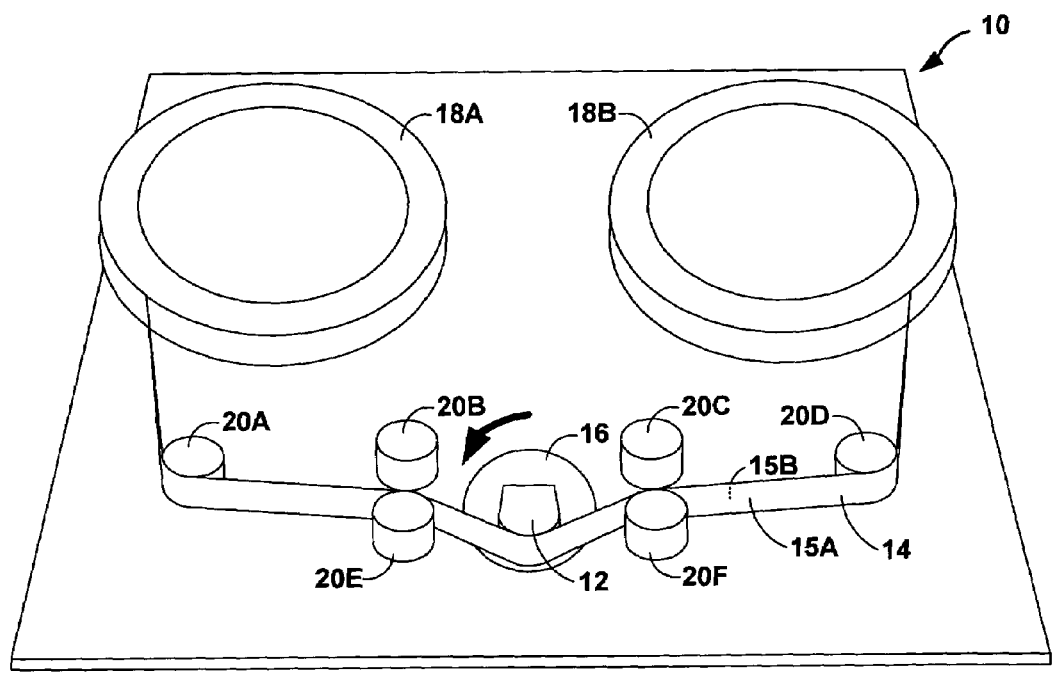

Head 12 may also access second side 15B of data storage tape 14. For example, in order to access side 15B of data storage tape 14, turntable 16 rotates head 12 back to the first position (as shown in FIG. 1D). Data storage tape 14 is then re-spooled onto spool 18A, removing data storage tape 14 from the proximity of head 12 (as shown in FIG. 1E). Turntable 16 rotates to position head 12 in the second position (as illustrated in FIG. 1F) and the data storage tape is unspooled from spool 18A in order to feed data storage tape 14 into proximity of head 12 (as shown in FIG. 1G). Turntable 16 rotates again to position head 12 in the first position (as shown in FIG. 1H). In this manner, head 12 is able to access second side 15B of data storage tape 14.

As shown in FIG. 1H, head 12 is in contact with second side 15B of data storage tape 14. The third subset of guides 20A, 20D, 20E and 20F positions data storage tape 14 along the third tape path (as shown in FIG. 1H) in order to facilitate the contact between head 12 and second side 15B of data storage tape 14. Once head 12 is positioned as in FIG. 1H, head 12 can read data from second side 15B or write data to second side 15B of data storage tape 14.

Figure 2:
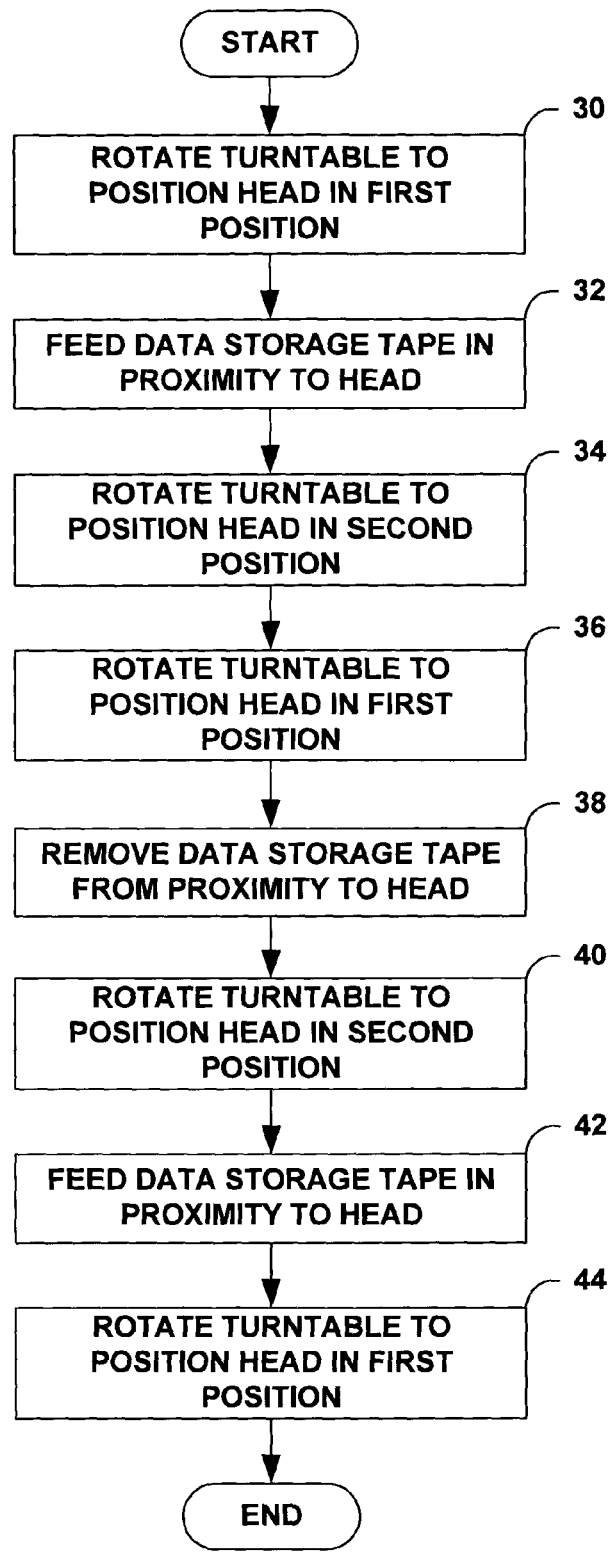
FIG. 2 is a flow diagram illustrating a process in which a single head can access both sides of a data storage tape.

FIG. 2 is a flow diagram illustrating techniques in which a single head 12 can access both sides of a data storage tape 14 in accordance with an embodiment of the invention. A data storage tape system, such as system 10 of FIG. 1, utilizes a tape drive comprising head 12 mounted on turntable 16 to simplify access to both sides 15A and 15B of data storage tape 14.

In accordance with the invention, turntable 16 may be rotated, e.g., by a motor, to move head 12 to a first position as shown in FIG. 1A (30). Data storage tape 14 is then fed into the proximity of head 12, e.g., passing from first spool 18A to second spool 18B through a tape path defined by first subset of guides 20A, 20D (32). For example, data storage tape 14 may be manually fed through the tape path, or fed via an automated feeder mechanism. In any case, turntable 16 rotates head 12 from the first position to a second position (34), thereby causing head 12 to contact first side 15A of data storage tape 14 (as illustrated in FIG. 1C). Head 12 may then read data from first side 15 or write data to first side 15A of data storage tape 14.

In order to access second side 15B of data storage tape 15, turntable 16 rotates head 12 back to the first position (as illustrated in FIG 1D) (36). Data storage tape 14 is then removed from the proximity of head 12 (as illustrated in FIG. 1E) (38). For example, spool 18A may be completely rewound to remove data storage tape 14 from the proximity of head 12. As illustrated in FIG. 1F, turntable 16 rotates head 12 back to the second position (40). Data storage tape 14 is then fed along the first tape path, and into the proximity of head 12 (as illustrated in FIG 1G) (42).

After feeding data storage tape 14 proximal to head 12, data storage tape system 10 rotates turntable 16, such that head 12 comes into contact with second side 15B of data storage tape 14 (as illustrated in FIG. 1H). In particular, turntable 16 rotates head 12 back to the first position (44). Once head 12 is in the first position, data storage tape system 10 may rotate spool 18B to pull data storage tape 14 through the tape path and over head 12. Head 12 may then read data from side 15B or write data to side 15B of data storage tape 14 as it passes over head 12.

System 10 allows for access to both of sides 15A, 15B of data storage tape 14 using a single head 12 mounted on a turntable 16. The invention may also incorporate tape feeder mechanism for automatic spooling or unspooling of data storage tape 14. For example, DLT leaders may be used to facilitate such automated spooling. However, the invention is not limited in that respect and other embodiments may implement manual spooling and unspooling of data storage tape 14.

A motor (not shown in FIGS. 1A–1H) may be used to rotate turntable 16. The motor may be controlled to automatically adjust turntable 16 in order to position head 12 to access the respective sides 15A, 15B of data storage tape 14. In some cases, system 10 may be further automated such that system 10 automatically causes head 12 to access a given side 15A based on a desired address or location of data on data storage tape 14. In other cases, system 10 may be responsive to manual commands in which a user specifies which side 15A, 15B should be accessed at any given time.

FIGS. 3A–3H are perspective views illustrating another exemplary data storage tape system 50 according to an embodiment of the invention. The embodiment depicted by FIGS. 3A–3H is similar to the embodiment depicted by FIGS. 1A–1H. However, system 50 does not require removal of data storage tape 54 from the proximity of head 52 in order to access both sides 55A, 55B of data storage tape 54. In particular, system 50 comprises a turntable 56 that rotates, and also moves up or down relative to the tape path of data storage tape 54. Accordingly, head 52 can be positioned in the tape path and removed from the tape path by raising and lowering turntable 56.

Figure 3A:
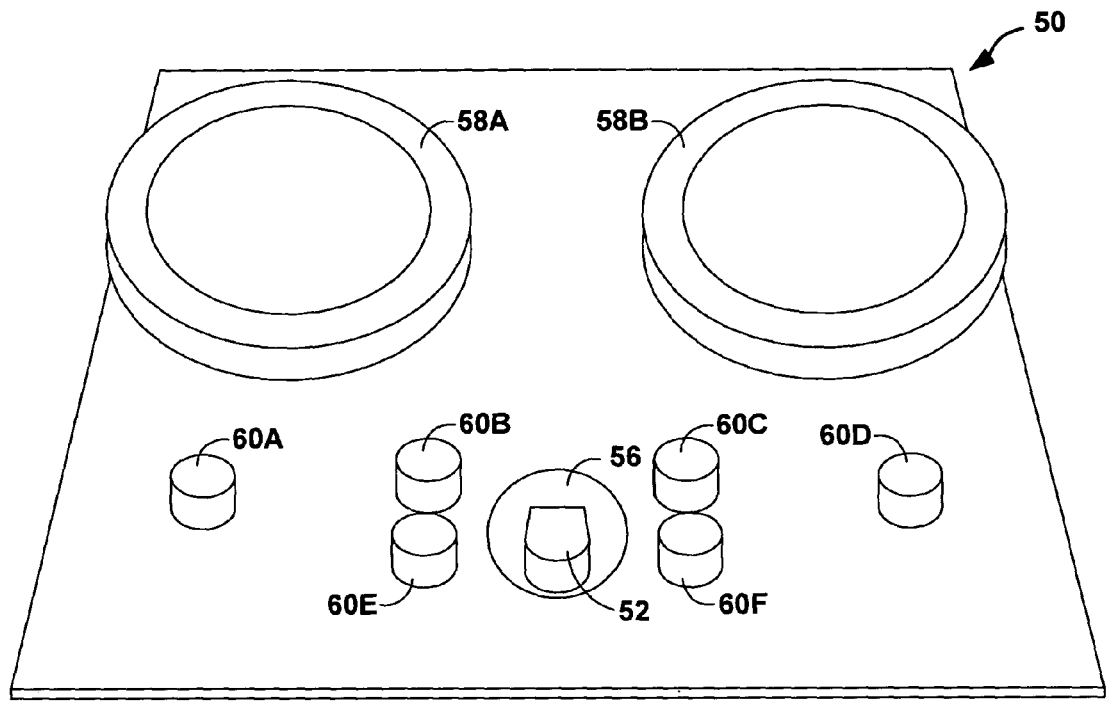
FIGS. 3A–3H are perspective views illustrating another exemplary data storage tape system according to an embodiment of the invention.

FIG. 3A is a perspective view illustrating data storage tape system 50 that includes head 52 mounted on turntable 56. System 50 includes spools 58A and 58B wound with data storage tape 54 and guides 60A–60F to define one or more tape paths though system 50. The tape paths are substantially similar to those described with reference to FIGS. 1A–1E, wherein a first subset of guides 60A and 60D define the first tape path, a second subset of guides 60A–60D define the second tape path and a third subset of guides 60A, 60E, 60F, and 60D define the third tape path.

In accordance with the invention, turntable 56 rotates to allow head 52 to access both sides 55A, 55B of data storage tape 54. In particular, turntable 56 rotates head 52 to first and second positions to facilitate access to both sides 55A and 55B of data storage tape 54. The first position may be 180 degrees of rotation from the second position, although the invention is not limited in that respect. A motor (not shown) may be controlled to facilitate rotation of turntable 56. In addition, the motor may further incorporate lateral movement so as to move turntable 56 relative to the tape path of data storage tape 54, e.g., upward or downward. In some embodiments, two motors may be used, e.g., one to rotate turntable 56 and another to raise and lower turntable 56 to facilitate positioning of turntable 56 relative to the tape path.

Figure 3B:
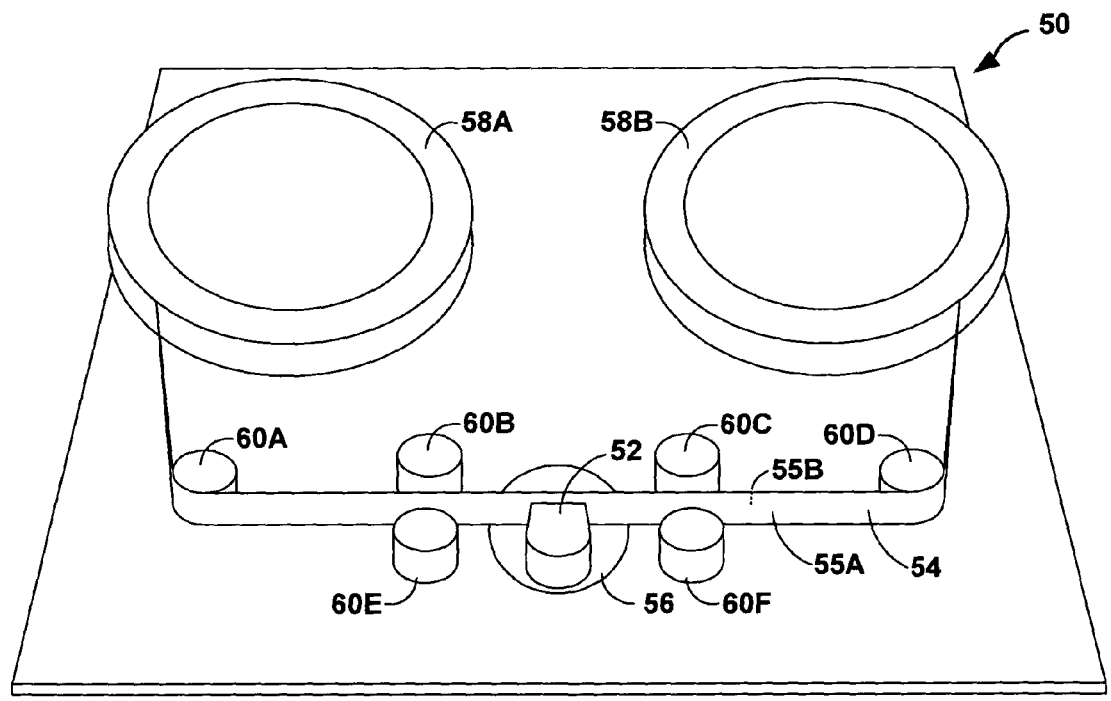
Figure 3C:
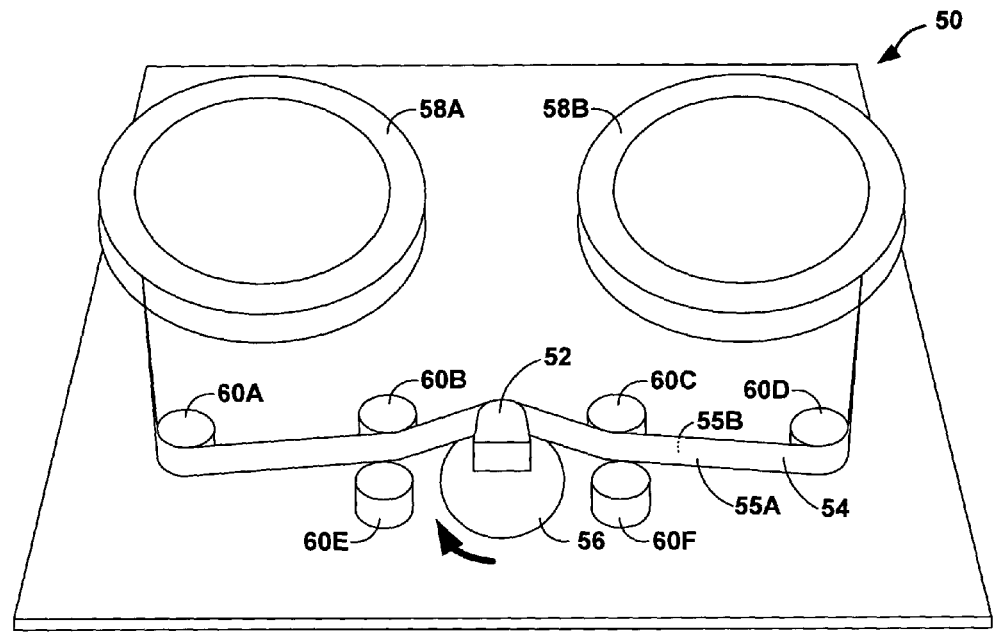

Data storage tape 54 is fed from spool 18A to spool 18B, e.g., by use of DLT leader mechanisms, manual feeding, or the like. The first subset of guides 60A and 60D positions data storage tape 54 along the first tape path proximal to head 52 as shown in FIG. 3B. Turntable 56 rotates head 52 to a second position, and head 52 contacts data storage tape 54 (as shown in FIG. 3C). The second subset of guides 60A–60D come into contact with data storage tape 54 to facilitate the contact between head 52 and data storage tape 54. Head 52 can then read data from first side 55A or write data to first side 55A of data storage tape 54 as it passes over head 52.

Figure 3D:
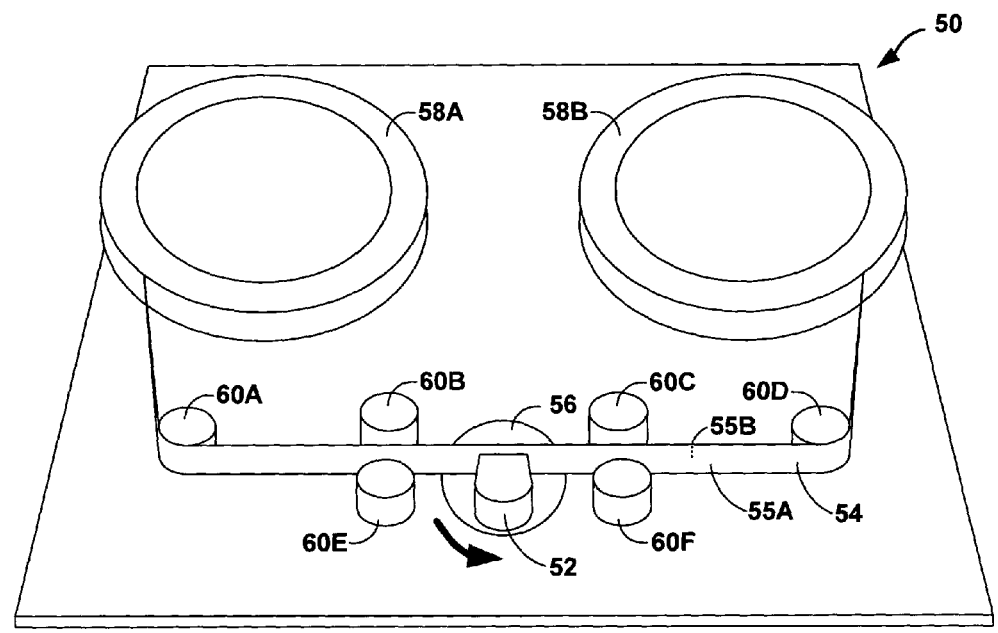

System 50 utilizing turntable 56 and head 52 can also access second side 55B of data storage tape 54. In particular, turntable 56 rotates head 52 from the second position (as illustrated in FIG. 3C) to the first position (as illustrated in FIG. 3D). In the configuration illustrated in FIG. 3D, head 52 is not in contact with data storage tape 54.

Figure 3E:
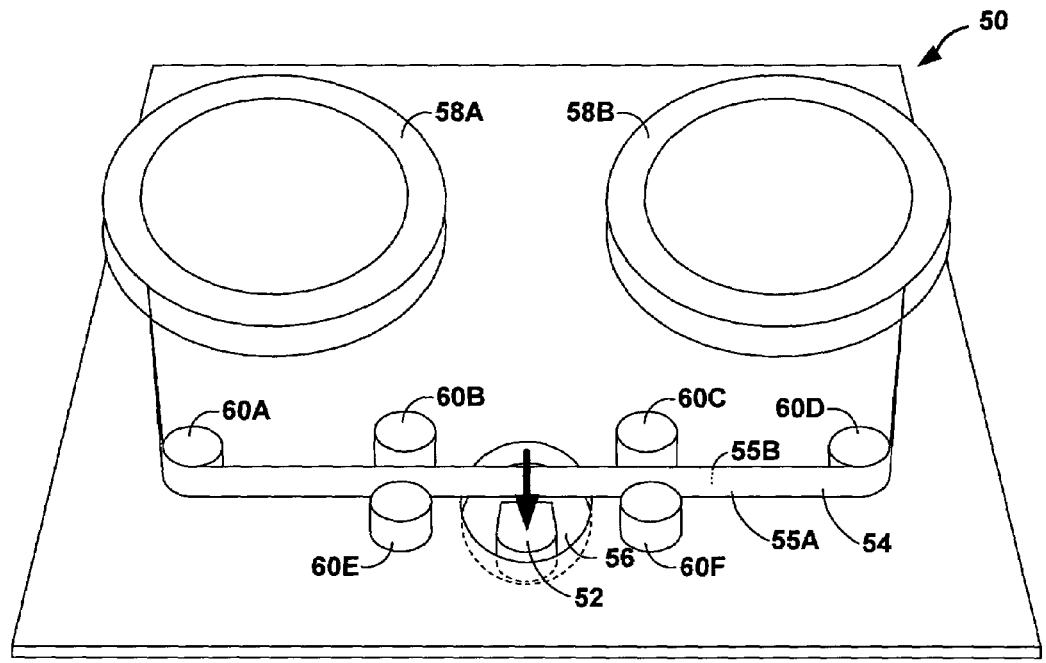
Figure 3F:
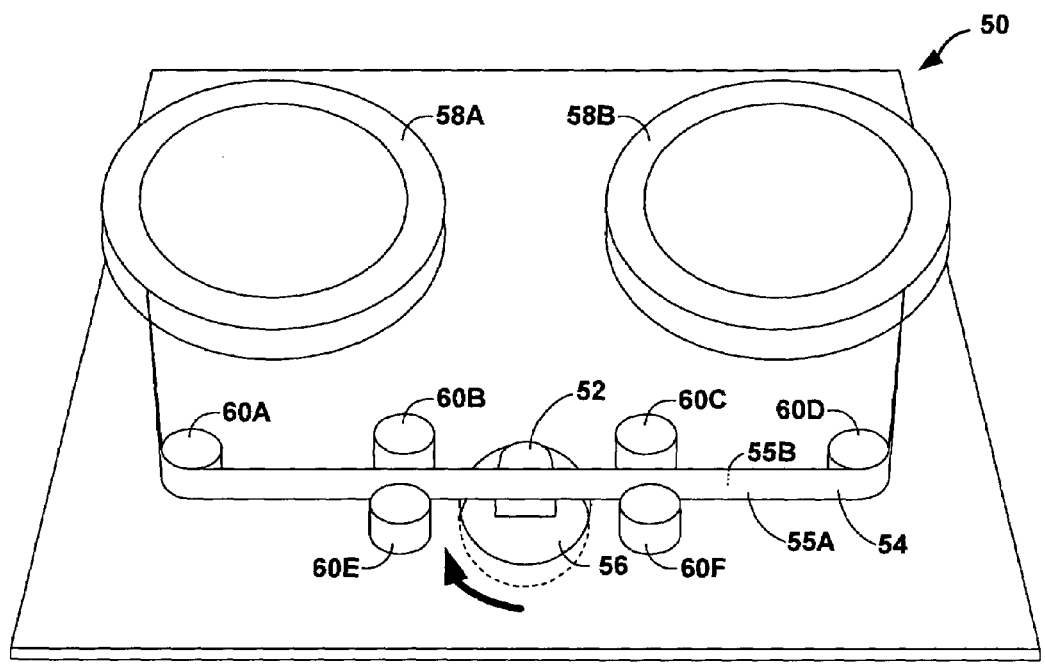

In accordance with the invention, turntable 56 lowers to descend head 52 below the tape path of data storage tape 54 (as illustrated in FIG. 3E). For example, a stepper motor can facilitate such lowering of turntable 56. Turntable 56 then rotates to position head 52 to the second position (as illustrated in FIG. 3F). The up and down movement of turntable 56, e.g., allowing turntable to descend below the tape path, facilitates access to both sides of data storage tape 54 without requiring re-spooling of data storage tape.

Figure 3G:
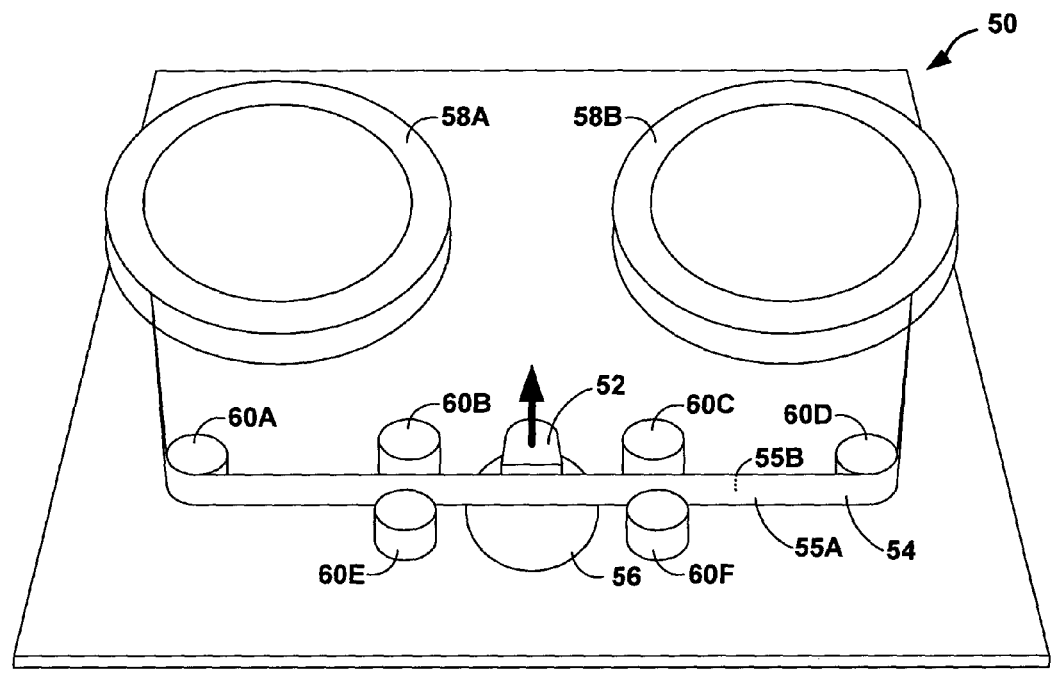
Figure 3H:
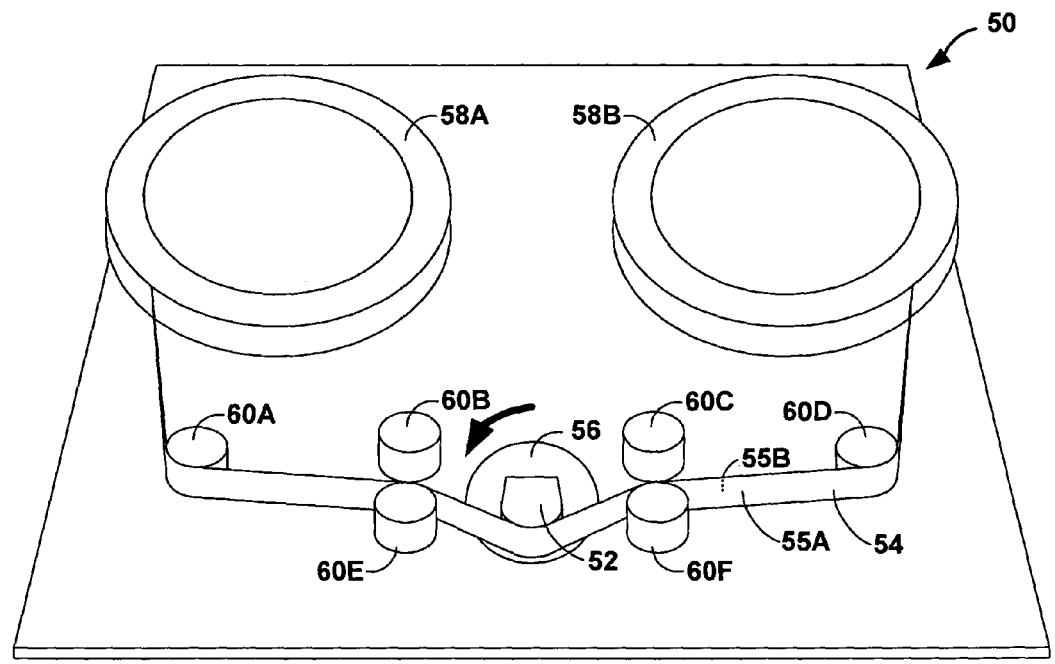

Turntable 56 is raised to elevate head 52 into the tape path of data storage tape 54 (as shown in FIG. 3G). Data storage tape system 50 then rotates turntable 56 to position head 52 from the second position (as illustrated in FIG. 3G) back into the first position (as shown in FIG. 3H). The third subset of guides 60A, 60D, 60E and 60F positions data storage tape 54 along the third tape path (as shown in FIG. 3H) to facilitate contact between head 52 and second side 55B of data storage tape 14.

Figure 4:
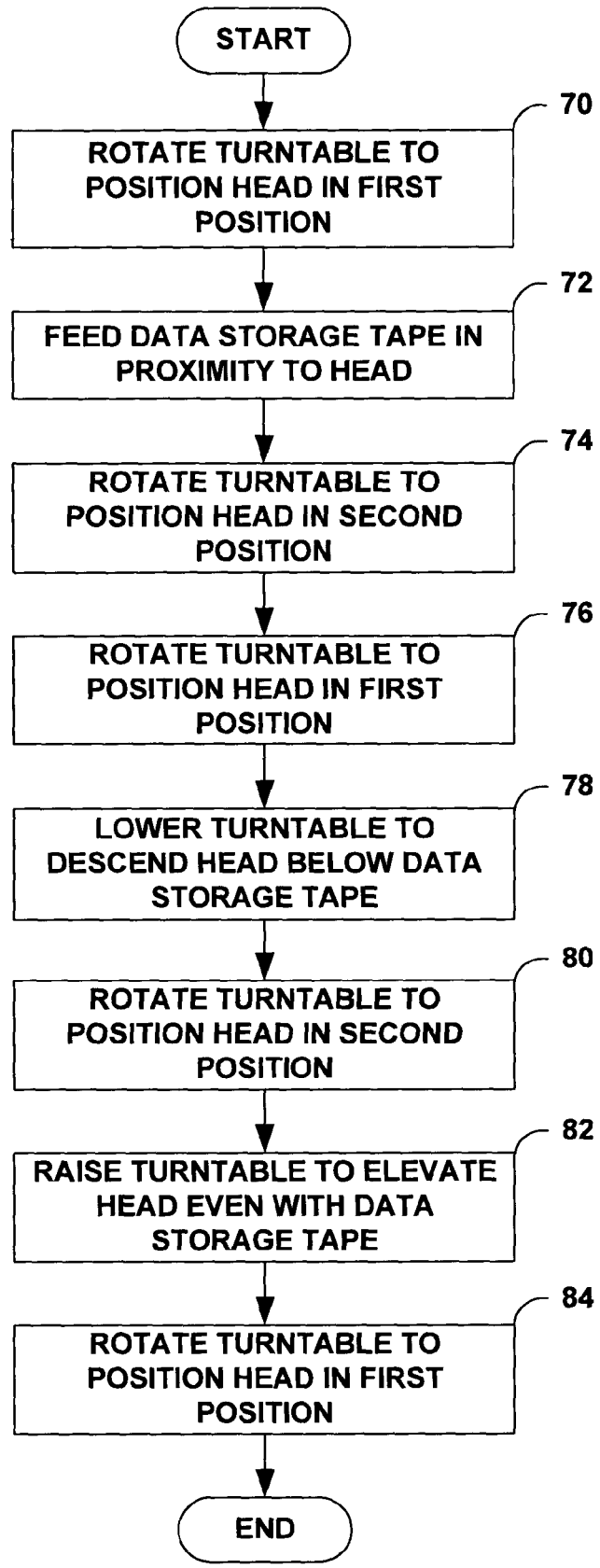
FIG. 4 is a flow diagram illustrating another process in which a single head can access both sides of a data storage tape.

FIG. 4 is a flow diagram illustrating techniques in which a single head can access both sides of a double-sided data storage tape, in accordance with an embodiment of the invention. Initially, data storage tape system 50 rotates turntable 56 to position head 52 in a first position (as illustrated in FIG. 3A) (70). Data storage tape 54 is fed into the proximity of head 52 (as illustrated in FIG. 3B) either manually or automatically by a tape feeder mechanism (72). Suitable tape feeder mechanisms include mechanisms that interact with DLT tape leader, e.g., on data storage tape 54, or the like, to pull tape 54 from spool 58A to spool 58B. Alternatively, data storage tape 54 can be manually fed into the proximity of head 52.

Turntable 56 rotates head 52 to a second position (74), which may be approximately 180 degrees of rotation from the first position. At that point, head 52 contacts first side 55A of data storage tape 54 (as illustrated in FIG. 3C). Head 52 reads data from first side 55A or writes data to first side 55A of data storage tape 54.

In order to access second side 55B of data storage tape 54, turntable 56 rotates head 52 back to the first position (76) and out of contact with data storage tape 54 (as illustrated in FIG. 3D). Turntable 56 then moves head 52 relative to the tape path of data storage tape 54. For example, turntable 56 lowers to descend head 52 below data storage tape 54 (78), as illustrated in FIG. 3E. After head 52 is below data storage tape 54, turntable 56 rotates head 52 to the second position (as illustrated in FIG. 3F) (80). Turntable 56 then raises to elevate head 52 into the tape path of data storage tape 54 (as illustrated in FIG. 3G) (82). Data storage tape system 50 rotates turntable 56 to position head 52 in the first position (84). In the first position (as shown in FIG. 3H), head 52 contacts data storage tape 54 in order to read or write data to second side 55B.

In accordance with the invention, data storage tape system 50 can access both sides 55A, 55B of data storage tape 54. In particular, data storage tape system 50 may access both sides 55A, 55B of a data storage tape 54 without removing the data storage tape from the proximity of the head. The rotational and up-down movement of turntable 56 facilitates such access to both sides of data storage tape 54 without requiring removal of data storage tape 54 from the tape path.

Figure 5:
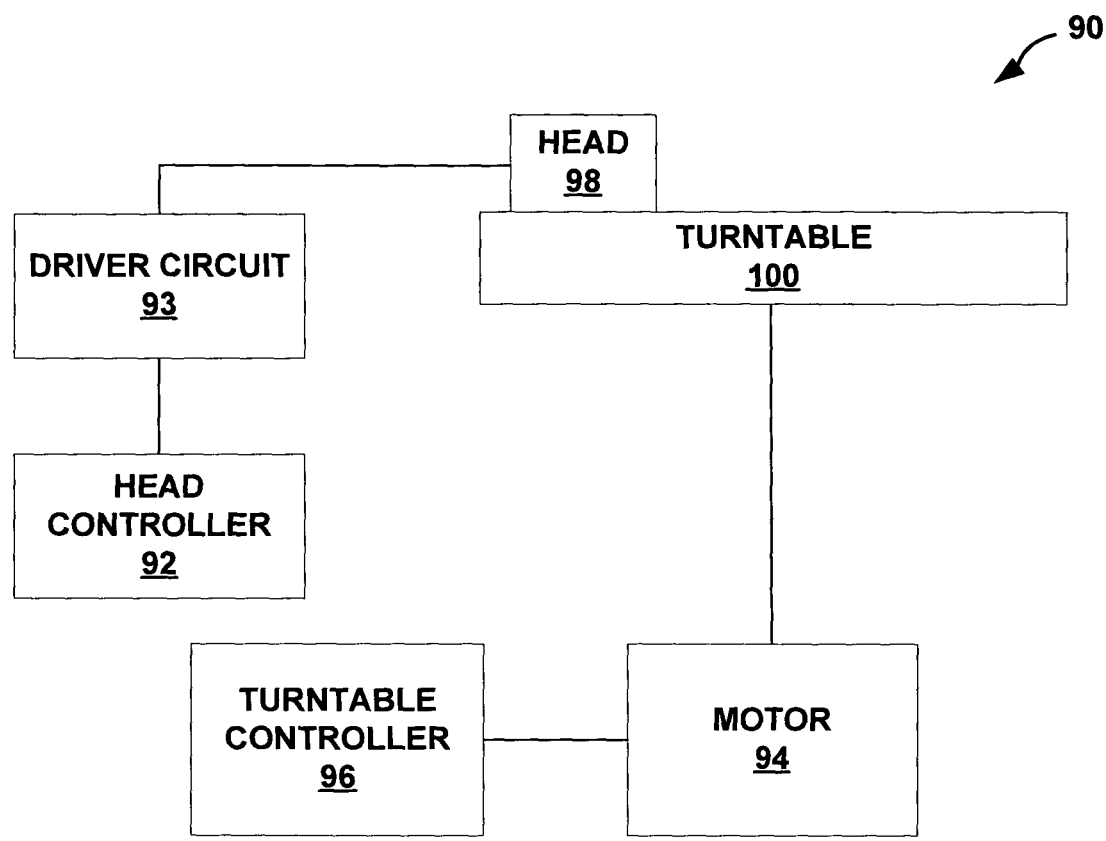
FIG. 5 is a conceptual block diagram illustrating an exemplary tape drive according to an embodiment of the invention.

FIG. 5 is a conceptual block diagram illustrating an exemplary tape drive 90 according to an embodiment of the invention. Tape drive 90 may form part of system 10 (FIGS. 1A–1H) or system 50 (FIGS. 3A–3H). Tape drive 90 comprises head 98 mounted on turntable 100. Turntable controller 96 controls motor 94 to move turntable 100, which also moves head 98. Specifically, motor 94 rotates turntable 100. In addition, motor 94 may allow for up-down movement of turntable 100 in order to elevate or descend turntable 100 relative to a tape path.

Turntable 100 and head 98 may correspond to turntable 56 and head 52 (FIGS. 3A–3H) or turntable 16 and head 12 (FIGS. 1A–1H). Turntable controller 96 issues control signals to motor 94 that cause turntable 100 to rotate. In this manner, head 98 can be positioned for access to either a first or a second side of data storage tape.

In some embodiments, motor 94 may also move turntable 100 relative to the tape path of the data storage tape. In particular, motor 94 may allow for up-down movement of turntable 100 in order to elevate or descend turntable 100 relative to a tape path (as shown in FIGS. 3A–3H). Alternatively, a separate motor may be used to facilitate the up-down movement of turntable 100.

Once head 98 is correctly positioned for access to either the first or second side of the data storage tape, head controller 92 operates head 98 to read or write data to the data storage tape. For example, head controller 92, may send signals to a driver circuit 93 that causes current to flow through a coil around head 98, thereby energizing head 98 and generating the magnetic field. For example, driver circuit 93 may send pulses of current regulated and timed at the direction of head controller 92, thereby writing data to the data storage tape. In order to read data, head 98 detects magnetic signals from a surface of a data storage tape, which causes current to flow through the coil around head 98. Head controller 92 may receive signals detected from the data storage tape, allowing the data stored on the data storage tape to be determined.

Various embodiments of the invention have been described. For example, systems and techniques for accessing both sides of data storage tape using a single head have been described. The head may comprise a magnetic transducer head that contacts magnetic tape, although the invention is not limited in that respect. Moreover, the head may comprise a servo write head used to create servo patterns on the data storage tape during tape fabrication, a read head used to read data from the data storage tape, a write head used to write data to the data storage tape, a read/write head capable of reading and writing data to the data storage tape, a servo verify head used to verify magnetically recorded servo signals during fabrication of the data storage tape, or any other type of head. These and other embodiments are within the scope of the following claims.

The invention claimed is:

1. A system comprising:
   double-sided data storage tape comprising first and second opposing sides;
   a turntable; and
   a head mounted on the turntable, wherein the turntable rotates to position the head in a first position, wherein the head has continuous access to the first side of the double-sided data storage tape when the head is in the first position, and wherein the turntable rotates to position the head in a second position, wherein the head has access to the second side of the double-sided data storage tape when the head is in the second position.

2. The system of claim 1, wherein the head accesses the first and second sides by contacting the first and second sides.

3. The system of claim 1, wherein the first position of the head comprises approximately 180 degrees of rotation of the turntable relative to the second position of the head.

4. The system of claim 1, wherein the turntable moves relative to a tape path of the data storage tape.

5. The system of claim 4, wherein the turntable rotates to disallow the head access to the tape and then lowers to descend the head below the tape path of the data storage tape.

6. The system of claim 5, wherein the turntable raises to elevate the head into the tape path of the data storage tape and then rotates to allow the head to access one of the first or second sides of the double-sided data storage tape.

7. The system of claim 1, further comprising a set of guides to facilitate contact of the head with the first and second sides of the data storage tape.

8. The system of claim 7, wherein only a subset of the set of guides contact the data storage tape.

9. The system of claim 1, wherein the head comprises a head selected from a group consisting of: a magnetic read head, a magnetic write head, a magnetic read/write head, a servo write head and a servo verify head.

10. The system of claim 1, wherein the data storage tape comprises tape selected from a group consisting of: magnetic tape, magneto-optical tape, optical tape and holographic tape.

11. A data storage tape drive comprising a head mounted on a turntable, wherein the turntable rotates to position the head in a first position, wherein the head has continuous access to a first side of a double-sided data storage tape when the head is in the first positions, and wherein the turntable rotates to position the head in a second position, wherein the head has access to a second opposing side of the double-sided data storage tape when the head is in the second position.

12. The data storage tape drive of claim 11, wherein the head accesses the first and second sides by contacting the first and second sides.

13. The data storage tape drive of claim 11, wherein the first position of the head comprises approximately 180 degrees of rotation of the turntable relative to the second position of the head.

14. The data storage tape drive of claim 11, wherein the turntable moves relative to a tape path of the data storage tape.

15. The data storage tape drive of claim 14, wherein the turntable rotates to disallow the head access to the tape and then lowers to descend the head below the tape path of the data storage tape.

16. The data storage tape drive of claim 15, wherein the turntable raises to elevate the head into the tape path of the data storage tape and then rotates to allow the head to access one of the first or second sides of the double-sided data storage tape.

17. The data storage tape drive of claim 11, wherein the head comprises a head selected from a group consisting of: a magnetic read head, a magnetic write head, a magnetic read/write head, a servo write head and a servo verify head.

* * * * *